(12) United States Patent
Zhang

(10) Patent No.: US 8,117,107 B2
(45) Date of Patent: Feb. 14, 2012

(54) METHOD FOR AUCTION BASED SIMULATION TO EXTRACT DEMAND CURVE

(75) Inventor: Alex Xin Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2556 days.

(21) Appl. No.: 09/895,690

(22) Filed: Jun. 29, 2001

(65) Prior Publication Data

US 2003/0014346 A1    Jan. 16, 2003

(51) Int. Cl.
*G06Q 40/00* (2006.01)
*G06Q 10/00* (2006.01)
*G06Q 30/00* (2006.01)
*G06F 17/50* (2006.01)
*G06F 9/44* (2006.01)

(52) U.S. Cl. ........ 705/37; 705/7.11; 705/7.29; 705/7.31

(58) Field of Classification Search ..................... 705/37
See application file for complete search history.

(56) References Cited

U.S. PATENT DOCUMENTS

| | | | | |
|---|---|---|---|---|
| 5,974,403 A | * | 10/1999 | Takriti et al. | 705/412 |
| 6,088,676 A | * | 7/2000 | White, Jr. | 705/1 |
| 2002/0082977 A1 | * | 6/2002 | Hammond et al. | 705/37 |

* cited by examiner

*Primary Examiner* — Shahid Merchant

(57) ABSTRACT

The present invention provides a novel simulation based method for analyzing new auction formats and rules, from limited and partially observable bidder characteristics. A simulation platform under this method is general enough to be easily modified to a specific design of auctions. This method will utilize the known results, if any, on some aspects of the auction rules under consideration, and simultaneously recover an extended set of bidder characteristics from limited and partially observed, existing bidder data, and will predict bidder behavior under the new auction rules. Advantageously, this method applies known results on some aspects of an auction format to the new learning of this format.

21 Claims, 7 Drawing Sheets

200A

| Previous Auction Number | 001 |
|---|---|
| Date of Auction Number 1: | 01/01/2001 |
| Auction Format: | English 1 |
| Time Begun: | 0100Z |
| Time Sold: | 1100Z |
| Duration: | 10 Hours |
| Average Action Speed: | 10 Bids/Hour |
| Number of Bidders: | 10 Bidders |
| Minimum Bidding Price: | $10.00 |
| Number of Bids: | 100 |
| Average Number of Bids/Bidder: | 10 |
| Minimum Bid Increment: | $1.00 |
| Price Sold: | $100.00 |
| Costs of Auction: | $10.00 |
| Revenue: | $90.00 |

/201

| Previous Auction Number | 002 |
|---|---|
| Date of Auction Number 2: | 01/02/2001 |
| Auction Format: | Dutch |
| Time Begun: | 0100Z |
| Time Sold: | 1100Z |
| Duration: | 10 Hours |
| Average Action Speed: | 10 Bids/Hour |
| Number of Bidders: | 10 Bidders |
| Minimum Bidding Price: | $100.00 |
| Number of Bids: | 100 |
| Average Number of Bids/Bidder: | 10 |
| Minimum Bid Increment: | $10.00 |
| Price Sold: | $1000.00 |
| Costs of Auction: | $10.00 |
| Revenue: | $990.00 |

/202

Ⓐ Ⓑ                                   Ⓒ Ⓓ

200A

| | |
|---|---|
| Previous Auction Number | 001 |
| Date of Auction Number 1: | 01/01/2001 |
| Auction Format: | English 1 |
| Time Begun: | 0100Z |
| Time Sold: | 1100Z |
| Duration: | 10 Hours |
| Average Action Speed: | 10 Bids/Hour |
| Number of Bidders: | 10 Bidders |
| Minimum Bidding Price: | $10.00 |
| Number of Bids: | 100 |
| Average Number of Bids/Bidder: | 10 |
| Minimum Bid Increment: | $1.00 |
| Price Sold: | $100.00 |
| Costs of Auction: | $10.00 |
| Revenue: | $90.00 |
| Previous Auction Number | 002 |
| Date of Auction Number 2: | 01/02/2001 |
| Auction Format: | Dutch |
| Time Begun: | 0100Z |
| Time Sold: | 1100Z |
| Duration: | 10 Hours |
| Average Action Speed: | 10 Bids/Hour |
| Number of Bidders: | 10 Bidders |
| Minimum Bidding Price: | $100.00 |
| Number of Bids: | 100 |
| Average Number of Bids/Bidder: | 10 |
| Minimum Bid Increment: | $10.00 |
| Price Sold: | $1000.00 |
| Costs of Auction: | $10.00 |
| Revenue: | $990.00 |

| Previous Auction Number | N |
|---|---|
| Date of Auction Number N: | 01/09/2001 |
| Auction Format: | English 2 |
| Time Begun: | 0100Z |
| Time Sold: | 1100Z |
| Duration: | 10 Hours |
| Average Action Speed: | 10 Bids/Hour |
| Number of Bidders: | 10 Bidders |
| Minimum Bidding Price: | $1000.00 |
| Number of Bids: | 100 |
| Average Number of Bids/Bidder: | 10 |
| Minimum Bid Increment: | $100.00 |
| Price Sold: | $10,000.00 |
| Costs of Auction: | $100.00 |
| Revenue: | $9,900.00 |

| Previous Auction Number | Bidder ID | Bid Price | Time of Bid |
|---|---|---|---|
| 001 | A20202 | $10 | 0105Z |
| 001 | A19585 | $15 | 0113Z |
| 001 | C30305 | $17 | 0221Z |
| 001 | B19231 | $18 | 0223Z |
| 001 | ... | ... | ... |
| 001 | ... | ... | ... |
| 001 | C22031 | $90 | 1059Z |
| 002 | C21010 | $100 | 0121Z |
| 002 | A10343 | $150 | 0135Z |
| 002 | A34359 | $189 | 0201Z |
| 002 | ... | ... | ... |
| 002 | ... | ... | ... |
| 002 | B19231 | $900 | 1050Z |
| 002 | C00208 | $990 | 1058Z |
| N | A30002 | $1,050 | 0202Z |
| N | B19231 | $1,200 | 0308Z |
| N | B02339 | $1,900 | 0330Z |
| N | ... | ... | ... |
| N | ... | ... | ... |
| N | B20238 | $9,900 | 1050Z |

Fig. 2B

| | |
|---|---|
| Auction Number: | 010 |
| Date of Auction: | 10/31/2001 |
| Time Bids to Begin: | 0100Z |
| Time Bidding to Cease: | OPEN TO SALE |
| Set Maximum Number of Bidders: | 100 |
| Set Minimum Bidder Qual Level:: | LEVEL 3 |
| Set Minimum Opening Bid: | $10.00 |
| Set Minimum Bidding Increment: | $1.00 |
| Number of Units for Sale: | 10 |
| Description of item for Sale: | spatula |
| Reference URL for item: | www.spatulas.com/ssgs/01 |
| Attachment (JPG, GIF, or PDF Formats): | spat001.jpg |

| SET RULES AS ENTERED | CLEAR ALL FIELDS | CLEAR HIGHLIGHTED FIELD |
|---|---|---|
| 303.1 | 303.2 | 303.3 |

Fig. 3

METHOD FOR AUCTION BASED SIMULATION TO EXTRACT DEMAND CURVE

BACKGROUND OF THE INVENTION

1. Field of the Invention

The present invention relates to the field of computer-based processes. Specifically, the present invention relates to a method for auction-based simulation to extract a demand curve.

2. Related Art

Modern electronic forum based auctions, such as World Wide Web and other Internet based auctions have complex rules with varied and partially observable bidder characteristics and behaviors. Analytical derivation of key bidder characteristics, for example, consumer willingness to pay, and prediction of auction outcomes, for example, seller's revenue, from limited and partially observed bidder data has been very difficult.

Conventional solutions to these problems are analytical, requiring mathematical, symbolic evaluation of simple auction designs and bidder characteristics. Such solutions, when available, are computationally slow and allow adequate and direct human interpretation of their results. However, such solutions are not always available for all auction situations.

Such solutions also have a disadvantage in that they require extraordinary skill and time to develop them. Further, conventional methods fail to deal with more complex auctions. And even if analytical solutions expressed in closed form formulas or equations are found for certain auction rules, it is unlikely that these would be applicable to new, or even slightly changed auction rules or formats.

What is needed is a method that can provide a simulation based method for analyzing new auction formats and rules, from limited and partially observable bidder characteristics and by utilizing any known results on some aspects of the new auction rules. What is also needed is a simulation platform that is general enough to be easily modified to a specific design of auctions. Further, what is needed is a method that can utilize known results on some aspects of the auction rules under consideration, and simultaneously recover an extended set of bidder characteristics from limited and partially observed, existing bidder data, and that can predict bidder behavior under the new auction rules.

SUMMARY OF THE INVENTION

An embodiment of the present invention provides a novel simulation based method for analyzing new auction formats and rules, from limited and partially observable bidder characteristics and by utilizing any known results on some aspects of the new auction rules. A simulation platform under this method is general enough to be easily modified to a specific design of auctions. Furthermore, this method will utilize the known results, if any, on some aspects of the auction rules under consideration, and simultaneously recover an extended set of bidder characteristics from limited and partially observed, existing bidder data, and will predict bidder behavior under the new auction rules. Advantageously, this method applies known results on some aspects of an auction format to the new learning of this format.

In one embodiment, the present invention provides a design tool, able to deal with the rapid introduction of new auction designs or modification of existing auction rules. The present embodiment is particularly advantageous in application to emerging and diverse consumer-to-consumer auctions.

In one embodiment, the present invention enables the extraction of information that is of interest to auction hosts and sellers. Such information includes, for example, underlying and indirectly observable bidder willingness to pay, preferences, and utility functions.

In one embodiment, the present invention enables the prediction of revenues and auction outcomes. Such information is of particular interest to auction hosts and sellers. Advantageously, one embodiment of the present invention provides a test tool for designers of auctions.

These and other objects and advantages of the present invention will become obvious to those of ordinary skill in the art after reading the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 2A and 2B depict the content arrays of a database of previous auction data for inputting, in accordance with one embodiment of the present invention.

FIG. 3 depicts a screen shot of a graphical user interface for inputting auction rules and parameters, in accordance with one embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, magnetic, optical, and/or electro-optical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "calculating" or "comparing" or "compiling" or "counting" or "deriving" or "designating" or "determining" or "entering" or "estimating" or "finding" or "generating" or "modeling" or "performing" or "promulgating" or "repeating" or "replacing" or "revising" or "selecting" or "simulating" or "summarizing" or "valuating" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

Figure 4A:
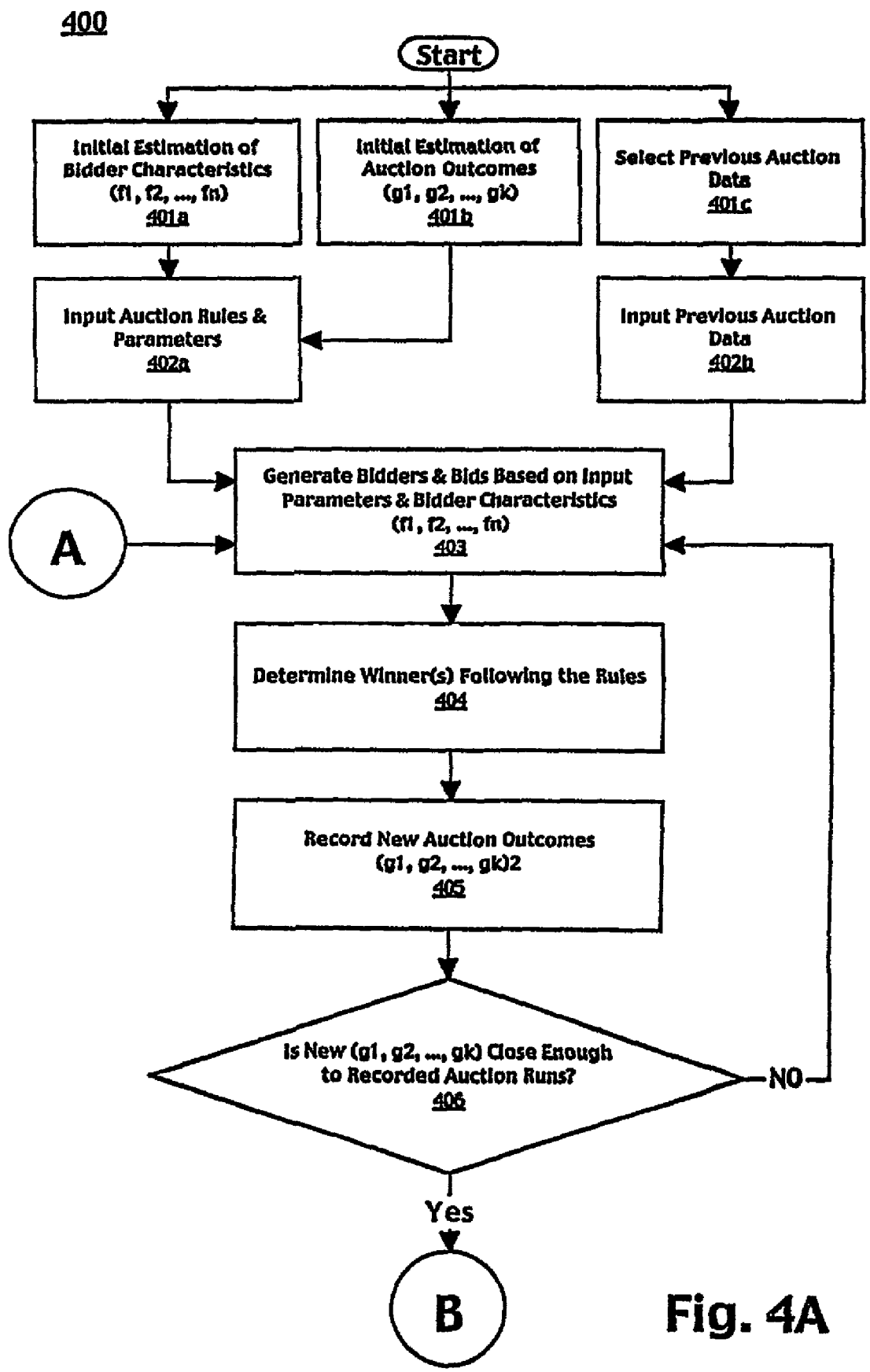
FIG. 4A is a flow chart of the steps in a process for implementing auction based simulations to extract a demand curve, in accordance with one embodiment of the present invention.
Figure 4B:
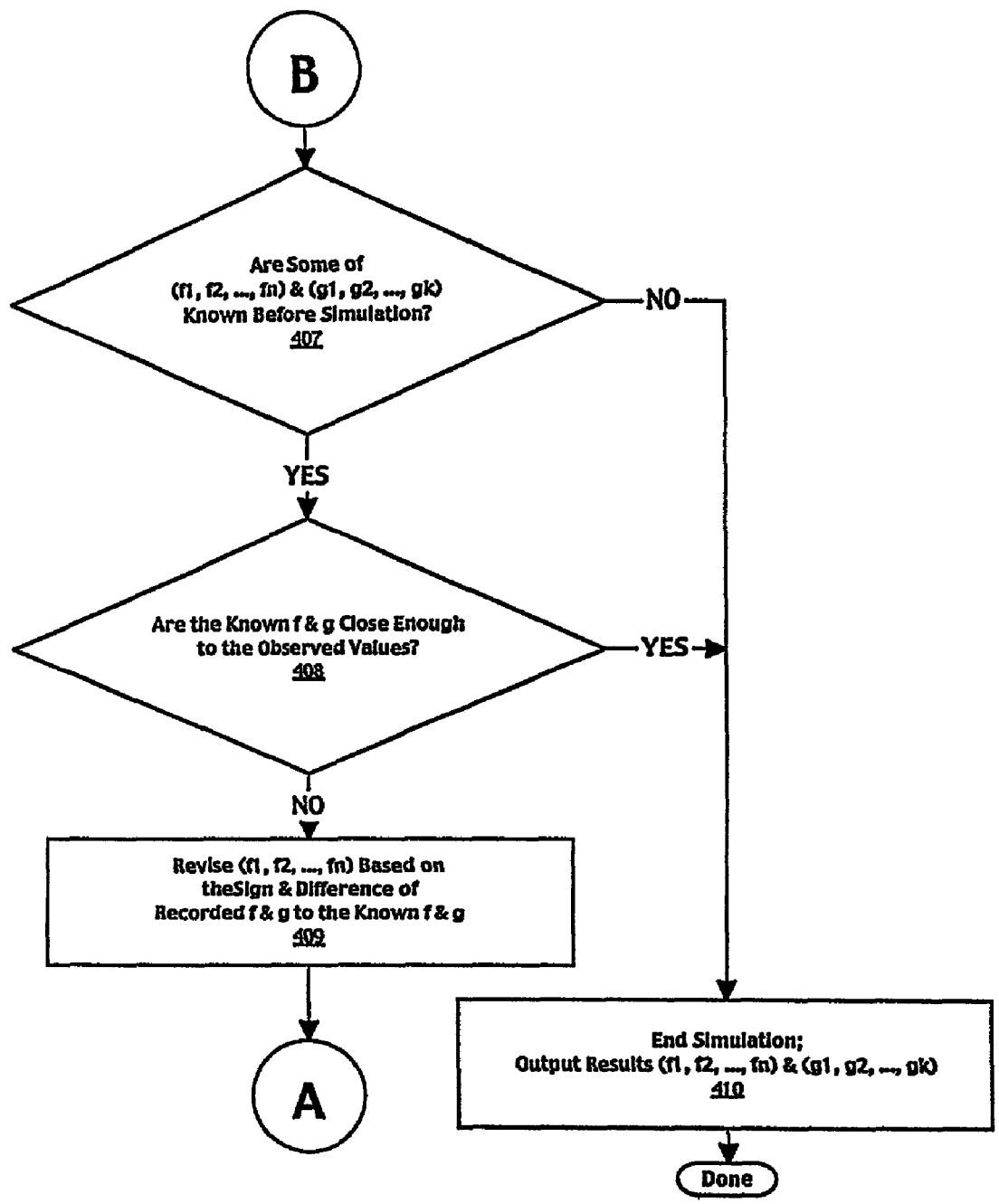
FIG. 4B is a continuation of the flowchart began in FIG. 4A.

Certain portions of the detailed descriptions of the invention, which follow, are presented in terms of processes (e.g., process 400, FIGS. 4A and 4B). These processes are, in one embodiment, carried out by processors and electrical and electronic components under the control of computer readable and computer executable instructions. The computer readable and computer executable instructions reside, for example, in registers and other features of processors, memories, and data storage features of computers executing programs and processes. However, the computer readable and computer executable instructions may reside in any type of computer readable medium. Although specific steps are disclosed in figures herein describing the operations of processes (e.g., FIGS. 4A and 4B; describing process 400), such steps are exemplary. That is, the present invention is well suited to performing various other steps or variations of the steps recited in the flowcharts of the figures herein. Further, it is appreciated that the steps of these processes may be performed by software or hardware or any combination of software and hardware.

The present invention is discussed primarily in the context of a method for analyzing new auction formats and rules, from limited and partially observable bidder characteristics and by utilizing any known results on some aspects of the new auction rules.

Exemplary System Platform
Exemplary Computer System

Figure 1:
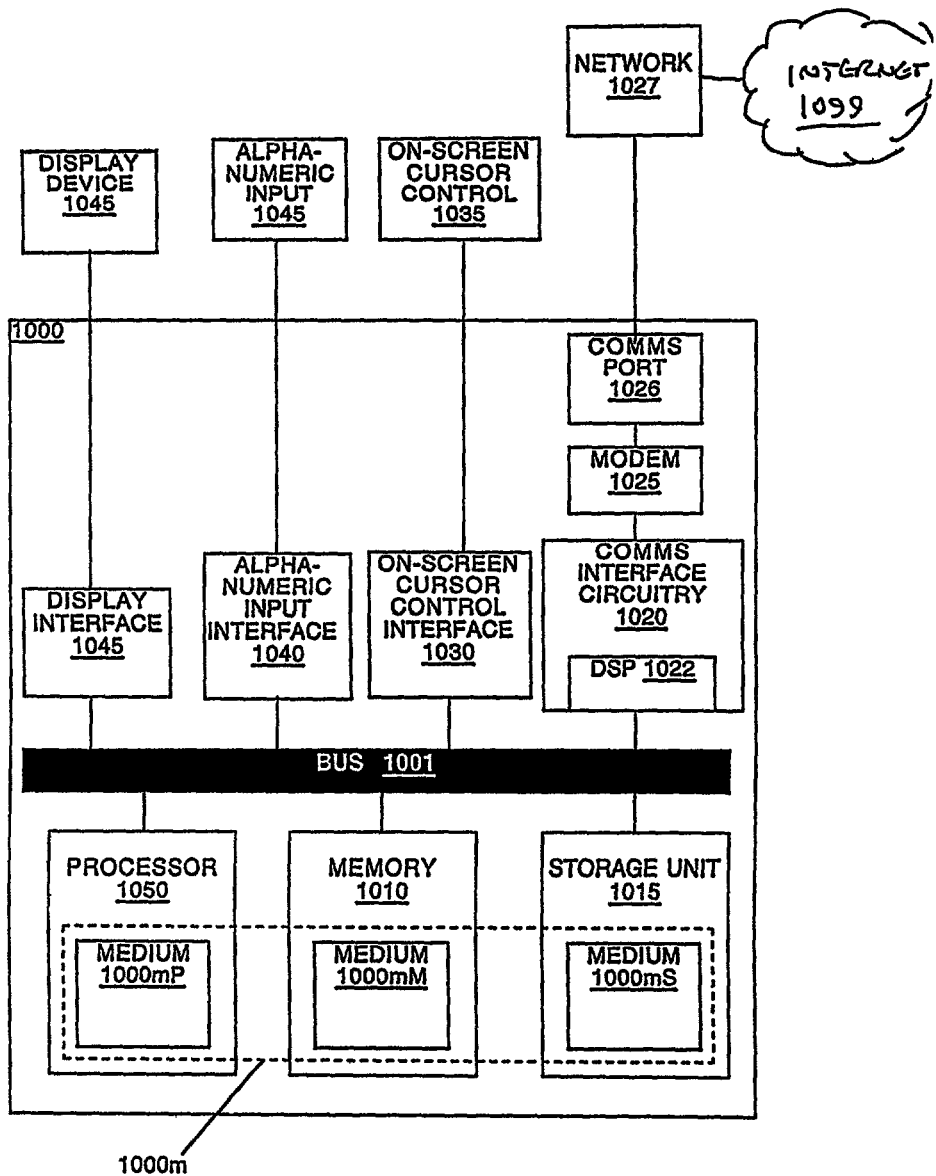
FIG. 1 is a block diagram depicting a computer system for implementing a process of auction based simulations to extract a demand curve, in accordance with one embodiment of the present invention.

FIG. 1 is a block diagram depicting the In accordance with one embodiment of the present invention, a computer system 1000 and computer usable medium 1000m enables the auction based simulations to extract a demand curve. With reference to FIG. 1, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described, including but not limited to auction based simulation to extract a demand curve (e.g., process 400; FIGS. 4A and 4B), may be executed by processor 1050, which may an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

In the present embodiment, computer system 1000 includes a communications device 1025. Communications device 1025 may be a modulator/demodulator (MODEM). Communications device 1025 enables communication via a communications port 1026.

In the present embodiment, computer system 1000 may be communicatively coupled with an external network 1027, via communications port 1026. External network 1027 may be a local area network (LAN), or any other feasible network configuration, and may include other networks including wide area networks (WAN) and the Internet 1099.

Computer system 1000 executes, in one implementation, a program embodied in a computer readable medium 1000$m$ which may be deployed in and/or to various degrees between processor 1050 (e.g., as 1000mP), memory 1010 (e.g., as 1000mM), and storage unit 1015 (e.g., as 1000mS). In the present implementation, execution of this program by computer system 1000 enables a process, which implements a method for analyzing new auction formats, outcomes, and rules, from limited and partially observable bidder characteristics and by utilizing any known results on some aspects of the new auction rules.

In one embodiment, bidder characteristics, auction outcomes and formats, and accompanying rules may be archived in, written to, retrieved from, and modified within a database (e.g., database 200$a$; FIG. 2). In one embodiment, database may be deployed within computer readable medium 1000$m$.

In the present embodiment, system 1000 also optionally contains a display interface 1045 coupled to the bus 1001 for enabling incorporation of a display device 1046. Display device 1046 enables displaying information to users. In one embodiment, display interface 1045 may be a graphical user interface (GUI). In one embodiment, display interface 105 enables an auction input interface (e.g., GUI 300; FIG. 3). In one embodiment, aspects of display interface 1045 may be deployed within computer readable medium 1000$m$.

System 1000 may include an alphanumeric input interface 1040 coupled to the bus 1001 for enabling incorporation of an alphanumeric input device 1041. Alphanumeric input device 1041 can communicate information and command selections to processor 1050 via alphanumeric input interface 1040 and bus 1001.

System 1000 also includes an optional cursor control or directing device (on-screen cursor control 1036) coupled to bus 1001 via on-screen cursor control interface 1030, for communicating user input information and command selections to processor 1050. In one implementation, on-screen cursor control 1036 is a mouse, trackball, joystick or special keys on alphanumeric input device 1041 capable of signaling movement of a given direction or manner of displacement.

Input interface 1040 and cursor control 1036 may both function, individually or in concert, as enabling mechanisms of an auction input (e.g., GUI 300; FIG. 3).

Exemplary Database

With reference to FIGS. 2A and 2B, auction outcomes and formats, and accompanying rules may, in one embodiment, be archived in, written to, retrieved from, and modified within a database 200a. In one embodiment, database may be deployed within a computer readable medium (e.g., computer readable medium 1000m; FIG. 1).

With reference specifically to FIG. 2A, records 201, 202, and 203 archive and make accessible data regarding past auctions. In the present example, records of three (3) auctions, 001, 002, and N, are within database 200a. It is appreciated that records of any number of auctions may be archived within database 200a, limited only by the constraints of the medium in which database 200a is embodied (e.g., medium 1000m, memory 1010, storage 1015, and processor 1050; FIG. 1).

In the present embodiment, records 201, 202, and 203 contain exemplary information about auctions 001, 002, and N as summarized in Table 1A, below.

TABLE 1A

| Auction Aspect Databased | Nature of Information |
| --- | --- |
| Previous Auction Number | cumulative ranking |
| Auction Format | description of auction rules |
| Time Auction Began | clock time in GMT |
| Time of Sale of item being auctioned | clock time in GMT |
| Duration of Auction | clock hours |
| Average Auction Speed | number of bids per hour |
| Number of Bidders | bidding population |
| Minimum Bidding Price | opening bid in Dollars U.S. |
| Number of Bids | total |
| Average Number of Bibs per Bidder | individual averages |
| Minimum Increment | incremental price rise |
| Price Sold | final bid in U.S. Dollars |
| Costs of Auction | overhead and fees |
| Revenue | profit |

It is appreciated that database 200a may contain information formatted differently from the format of exemplary records 201, 202, and 203. Further, it is appreciated that records 201, 202, and 203 may contain other information, including information not listed in Table 1A.

Referring now specifically to FIG. 2B, a database 200b contains information about previous auctions emphasizing which bidders, identified by an identifying code number, bid at what price, and the time of the bid. This is summarized in Table 1B, below.

TABLE 1A

| Auction Aspect Databased | Nature of Information |
| --- | --- |
| Previous Auction Number | cumulative ranking |
| Bidder ID | coded identity of bidders |
| Bid Price | price bid by bidder |
| Time of Bid | clock time in GMT |

It is appreciated that database 200b may contain information formatted differently from the exemplary records which are illustrated. Further, it is appreciated that the illustrated records may contain other information, including that not listed in Table 1A.

With reference to FIG. 3, a screen shot of an exemplary graphical user interface (GUI) 300 is depicted as it appears on a computer's display device (e.g., display device 1045; FIG. 1). In one embodiment, GUI 300 enables a user to input auction rules and parameters to be applied in implementing certain processes (e.g., process 400; FIGS. 4A and 4B), which execute a method for analyzing new auction formats, outcomes, and rules, from limited and partially observable bidder characteristics and by utilizing any known results on some aspects of the new auction rules. It is appreciated that GUI 300 may be deployed in any on-screen, or other user-enabling format, not limited to the display depicted.

In the present example, a specification field 301 displays to a user auction criteria requiring user specification to designate auction rules and parameters to be applied in the execution of an auction and/or auction simulation. The auction criteria specified in the present example are summarized in Table 2, below.

TABLE 2

| Auction Criteria Displayed | Nature of Information |
| --- | --- |
| Auction Number | numerical designator |
| Date of Auction | mm/dd/yyyy format |
| Time Auction to Begin | clock time in GMT |
| Time Auction to Cease | clock time in GMT |
| Duration of Auction | clock hours |
| Set Maximum Number of Bidders | delimit bidder population |
| Set Minimum Bidder Qualification Level | bidder sophistication |
| Set Minimum Opening Bid | opening bid in Dollars U.S. |
| Number of Units for Sale | total |
| Description of Item for Sale | description |
| Reference Uniform Resource Locator | URL item can be studied |
| Attachment | textual or graphical |

A user may respond to the prompting of field 301 by entering corresponding information into the appropriate spaces provided in user input field 302. Input may be by an alphanumeric input device such as a keyboard (e.g., alphanumeric input 1045; FIG. 1), by an on-screen cursor control (e.g., cursor control 1035; FIG. 1), a combination of alphanumeric and cursory inputs, light pen, touch screen, digitizer, and/or any other user input enabling modality.

In the present embodiment, button 303.1 accepts the information entered into the appropriate spaces in user input field 302. Button 303.2 clears all information entered into user input field 302 spaces. Button 303.3 allows a user to change data entered into a single space or multiple number of spaces in user input field 302 by highlighting the field 302 spaces to be cleared via GUI 300, and clearing only the highlighted fields by activating on-screen button 303.3. Conveniently, this allows selective editing without having to reenter the entire corpus of information entered in field 302, saving user time and effort.

Exemplary Process

With reference to FIG. 4A and 4B, the steps in a process 400 enable a method for analyzing new auction formats and rules, from limited and partially observable bidder characteristics and by utilizing any known results on some aspects of the new auction rules, in accordance with one embodiment of the present invention. The FIGS. 4A and 4B are separated herein only for special and corresponding pagination related reasons; separation of processes thereon is not implied thereby, nor is it to be inferred.

FIGS. 4A and 4B depict flowchart 400 of steps performed in accordance with one embodiment of the present invention for auction based simulation to extract a demand curve. Flowchart 400 includes processes of the present invention which, in one embodiment, are carried out by processors and electrical components under the control of computer readable and computer executable instructions. The computer readable and computer executable instructions reside, for example, in features such as data storage 1015, computer memory 1010 and/or registers and other structures in processor 1050 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIGS. 4A and 4B.

Process 400 begins with steps 401a, 401b, and 401c, occurring simultaneously, or in any order. In step 401a, an initial estimation of bidder characteristics f1, f2, . . . fn is made.

In one embodiment, bidder characteristic f1 corresponds to the percentage of all potential bidders who are willing to pay a price p1 (e.g., $100); f2 corresponds to the percentage of all bidders who are willing to pay a price of p2 (e.g., $150), etc. The numbers f1, f2, . . . fn thus form a demand curve, which describes the relationship between demand, e.g., the number of potential buyers, and price.

In one embodiment, auction outcome g1 refers to the highest bid; g1, g2, g3, and gk are examples of auction outcome. As will become evident, there are different types of auction outcomes, such as initial auction outcomes, new auction outcomes, recorded auction outcomes, and newly recorded auction outcomes, among other things.

In step 401b, an initial estimation is made, predicting auction outcomes g1, g2, . . . , gk. In step 401c, previous auction data is selected to achieve a match as closely as possible to the new auction format. Previous auction data may be gathered from a database (e.g., database 200a; FIG. 2).

Continuing with steps 402a and 402b, which may be completed simultaneously, or in any order, inputs are made by a user interface (e.g., GUI 300; FIG. 3). In step 402a, auction rules and parameters are inputted. In one embodiment, one auction parameter is the total time permitted for the auction duration. In one exemplary instance, one of the new rules is that the auction will terminate if no new bid is received within 30 minutes.

In step 402b, previous auction data is inputted. Input is made to an analytical engine such as a computer processor (e.g., processor 1050; FIG. 1) capable of processing the information analytically.

In step 403, bidders and bids are generated by the analytical engine using a random number generator upon analyses based on input parameters and bidder characteristics f1, f2, . . . , fn.

In step 404, the random numbers generated are transformed and modified to represent a typical, but uncertain stream of bidders, their bids, and the times of their bids (e.g., database 200b contents; FIG. 2B).

New auction outcomes g1, g2, . . . , gk are recorded; step 405.

In step 406, it is determined whether the newly recorded auction outcomes g1, g2, . . . , gk are tolerably close to recorded auction data for statistical confidence. If not, process 400 loops back to repeat step 403 and subsequent steps, until statistical confidence is obtained. In one embodiment, it may be typical to loop through repeating steps 403-406 on the order of 10,000 times to achieve a satisfactory statistical confidence level.

If statistical confidence is assured by the new data tolerably comparing to previous auction data (step 406), it is determined in step 407 whether some of the bidder characteristics f1, f2, . . . , fn and auction outcomes g1, g2, . . . , gk were known prior to executing the simulation. If not, the simulation is terminated, and the resultant data f1, f2, . . . , fn and g1, g2, . . . , gk outputted; step 410. Process 400 may be complete at this point.

If some of the bidder characteristics f1, f2, . . . , fn and auction outcomes g1, g2, . . . , gk were known prior to the simulation (step 407), it is determined in step 408 whether the known bidder characteristic f and/or auction outcome g is tolerably close to the observed values. For example, it is known prior to running the simulation, from actual known auctions stored in the database, that the number of bidders would average 80, given the bidder characteristics and parameters, and outcome g2 for the number of bidders is recorded for each execution of steps 403-406. A comparison is then made of the prior knowledge (e.g., databased) average g2 to the observed (e.g., recorded) g2. If so, e.g., if databased average g2 is tolerably close to recorded g2, the simulation is terminated, and the resultant data f1, f2, . . . , fn and g1, g2, . . . , gk outputted; step 410. Process 400 may be complete at this point.

If the known bidder characteristic f and/or auction outcome g is not found to be tolerably close to the observed values (step 408), then it is determined whether the assumed bidder characteristics f1, f2, . . . , fn agree with the outcome. If they do not, bidder characteristics f1, f2, . . . , fn are revised based on the sign and difference of the recorded bidder characteristics f and auction outcomes g to the known bidder characteristics f and auction outcomes g. Again, for the example of g2=80 bidders, if the recorded number of bidders is 70, then the total bidding population size (fn) or the percentage of bidders in a particular price level (e.g., f1) would be increased. In this case, the revised bidder characteristics are reentered, and process 400 loops back to step 403 and subsequent steps, which is repeated until step 410 is reached.

In summary, the present invention provides a method for analyzing new auction formats and rules, from limited and partially observable bidder characteristics and by utilizing any known results on some aspects of the new auction rules. A simulation platform under this method is general enough to be easily modified to a specific design of auctions. Furthermore, this method will utilize the known results, if any, on some aspects of the auction rules under consideration, and simultaneously recover an extended set of bidder characteristics from limited and partially observed, existing bidder data, and will predict bidder behavior under the new auction rules. Advantageously, this method applies known results on some aspects of an auction format to the new learning of this format.

An embodiment of the present invention, a method for auction based simulation to extract a demand curve, is thus described. While the present invention has been described in particular embodiments, it should be appreciated that the present invention should not be construed as limited by such embodiments, but rather construed according to the following claims.

What is claimed is:

1. A computer-implemented method for analyzing new auction formats and rules comprising:

estimating, performed by a computer system, bidder characteristics associated with potential auction participants;

estimating, performed by said computer system, a value of an outcome of a market transaction to generate an estimated value;

accessing, performed by said computer system, a set of new auction rules and formats;

accessing, performed by said computer system, data from a previous auction, said data associated with at least one of said auction rules and formats;

modeling, performed by said computer system, a new auction using said new auction rules, said formats and said bidder characteristics to generate a post modeled auction value;

comparing, performed by said computer system, said post modeled auction value with said estimated value; and modifying, performed by said computer system, said bidder characteristics and repeating said modeling, said comparing and said modifying until said post modeled auction value is said estimated value.

2. The method of claim 1, further comprising:

replacing, performed by said computer system, said estimated value with said post modeled auction value; and repeating said modeling, said comparing and said modifying.

3. The method of claim 1, wherein said data includes a known value of said post modeled auction value.

4. The method of claim 3, further comprising:

comparing, performed by said computer system, said post modeled auction value to known characteristics associated with said potential market participants.

5. The method of claim 1, wherein a simulation medium is used to extract a demand curve for an exchange transaction based on said modeled new auction.

6. The method of claim 5, wherein said exchange transaction is an auction-based transaction.

7. The method of claim 6 wherein said auction-based transaction is performed electronically.

8. A computer system comprising:

a bus;

a memory coupled with said bus;

a processor coupled with said bus, wherein said processor executes a method for analyzing new auction formats and rules comprising:

estimating bidder characteristics associated with potential auction participants;

estimating a value of an outcome of a market transaction;

accessing a set of new auction rules and formats;

accessing data from a previous auction, said data associated with at least one of said auction rules and formats;

modeling a new auction using said new auction rules, said formats and said bidder characteristics to generate a post modeled auction value;

comparing said post modeled auction value with said estimated value; and modifying said bidder characteristics and repeating said modeling, said comparing and said modifying until said post modeled auction value is said estimated value.

9. The computer system of claim 8 wherein said method further comprises:

replacing said estimated value with said post modeled auction value; and repeating said modeling, said comparing and said modifying.

10. The computer system of claim 8 wherein said data includes a known value of said post modeled auction value.

11. The computer system of claim 10 wherein said method further comprises:

comparing said post modeled auction value to known characteristics associated with said potential market participants.

12. The computer system of claim 8, wherein a simulation medium is used to extract a demand curve for an exchange transaction based on said modeled new auction.

13. The computer system of claim 12, wherein said exchange transaction is an auction-based transaction.

14. The computer system of claim 13 wherein said auction-based transaction is performed electronically.

15. A non-transitory computer readable medium causing a computer system to execute a method for analyzing new auction formats and rules, said method comprising:

estimating bidder characteristics associated with potential auction participants;

estimating a value of an outcome of a market transaction;

accessing a set of new auction rules and formats;

accessing data from a previous auction, said data associated with at least one of said auction rules and formats;

modeling a new auction using said new auction rules, said formats and said bidder characteristics to generate a post modeled auction value;

comparing said post modeled auction value with said estimated value; and modifying said bidder characteristics and repeating said modeling, said comparing and said modifying until said post modeled auction value is said estimated value.

16. The non-transitory computer readable medium of claim 15 wherein said method further comprises:

replacing said estimated value with said post modeled auction value; and repeating said modeling, said comparing and said modifying.

17. The non-transitory computer readable medium of claim 15 wherein said data includes a known value of said post modeled auction value.

18. The non-transitory computer readable medium of claim 17 wherein said method further comprises:

comparing said post modeled auction value to known characteristics associated with said potential market participants.

19. The non-transitory computer readable medium of claim 15, wherein a simulation medium is used to extract a demand curve for an exchange transaction based on said modeled new auction.

20. The non-transitory computer readable medium of claim 19 wherein said exchange transaction is an auction-based transaction.

21. The non-transitory computer readable medium of claim 20 wherein said auction-based transaction is performed electronically.

* * * * *

UNITED STATES PATENT AND TRADEMARK OFFICE
CERTIFICATE OF CORRECTION

| | | |
|---|---|---|
| PATENT NO. | : 8,117,107 B2 | Page 1 of 1 |
| APPLICATION NO. | : 09/895690 | |
| DATED | : February 14, 2012 | |
| INVENTOR(S) | : Alex Xin Zhang | |

It is certified that error appears in the above-identified patent and that said Letters Patent is hereby corrected as shown below:

In column 7, lines 23-27, delete "bid; g1, g2, g3, and gk are examples of auction outcome. As will become evident, there are different types of auction outcomes, such as initial auction outcomes, new auction outcomes, recorded auction outcomes, and newly recorded auction outcomes, among other things." and insert -- bid. --, therefor.

Signed and Sealed this
Thirtieth Day of October, 2012

David J. Kappos
*Director of the United States Patent and Trademark Office*